W. G. PASSMORE.
WHEEL.
APPLICATION FILED JUNE 26, 1916.

1,217,997.

Patented Mar. 6, 1917.
2 SHEETS—SHEET 1.

Witnesses

W. G. Passmore,
Inventor by
Attorneys

W. G. PASSMORE.
WHEEL.
APPLICATION FILED JUNE 26, 1916.
1,217,997.
Patented Mar. 6, 1917.
2 SHEETS—SHEET 2.
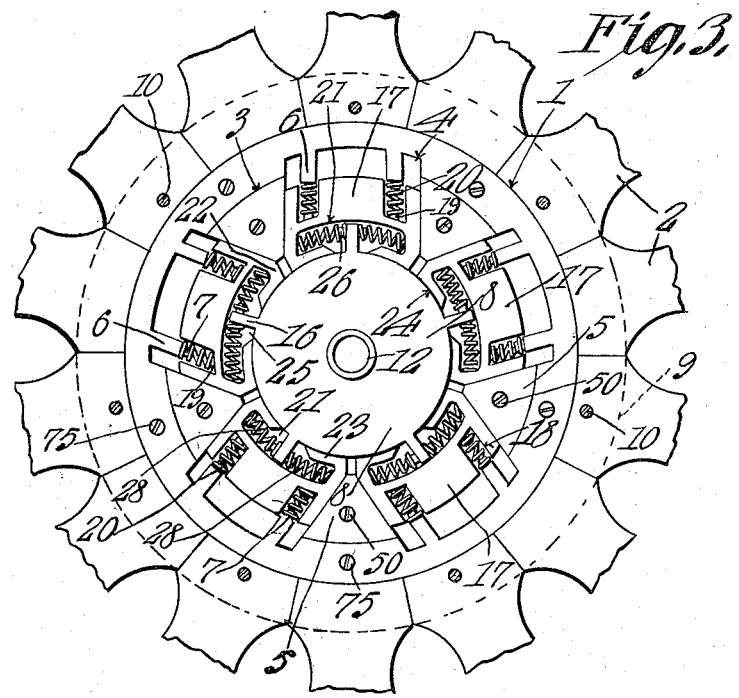
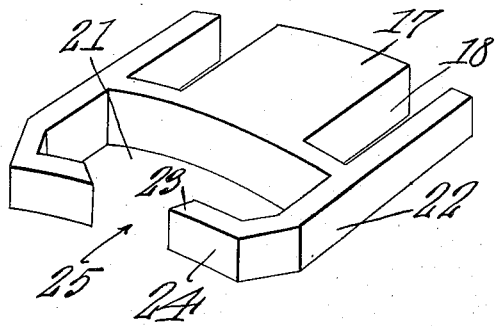
Witnesses
W. G. Passmore,
Inventor
by
Attorneys

UNITED STATES PATENT OFFICE.

WILLIAM G. PASSMORE, OF SARATOGA, WYOMING.

WHEEL.

1,217,997.  Specification of Letters Patent.  Patented Mar. 6, 1917.

Application filed June 26, 1916.  Serial No. 106,044.

*To all whom it may concern:*

Be it known that I, WILLIAM G. PASSMORE, a citizen of the United States, residing at Saratoga, in the county of Carbon and State of Wyoming, have invented a new and useful Wheel, of which the following is a specification.

The device forming the subject matter of this application is a spring wheel, and the invention aims, primarily, to improve the spring hub construction of the wheel.

Another object of the invention is to improve the followers and to provide novel means whereby the springs of the wheel are made to coact with the followers.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—

Fig. 3 is a fragmental side elevation of the wheel, one of the cover plates being removed; and Fig. 4 is a perspective view of the follower.

Figure 1:
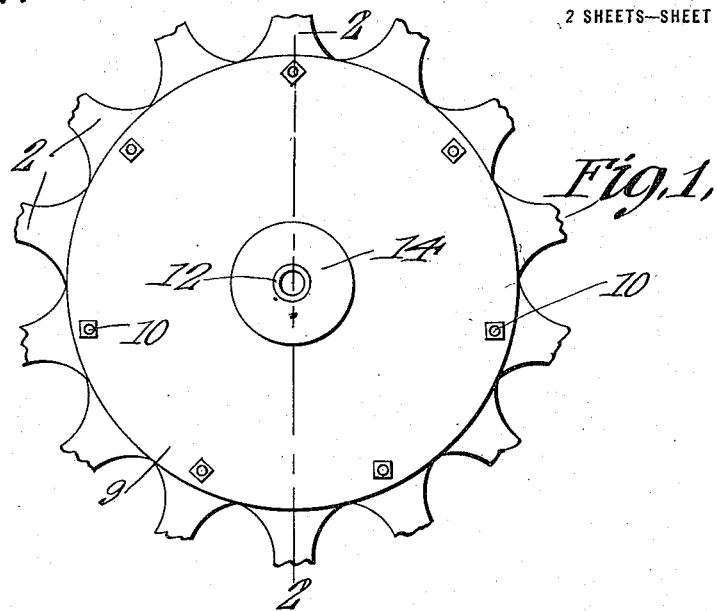
Figure 1 shows in side elevation, a wheel embodying the present invention, portions of the wheel being broken away.
Figure 2:
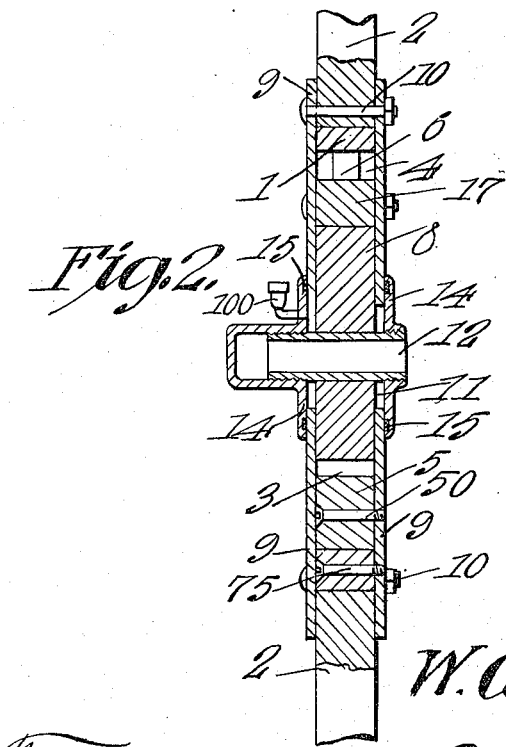
Fig. 2 is a cross section taken approximately on the line 2—2 of Fig. 1.

The wheel forming the subject matter of this application includes an annular body 1 forming an abutment for the inner ends of spokes 2 adapted to support a tire and a rim of any sort (not shown). I am aware of the fact that no specific form of tire can be covered in the same application with a spring hub, and therefore, no tire has been shown, it being understood that the tire may be constructed as desired. Applied to opposite sides of the body 1 and the spokes 2 are side plates 9, held in place by bolts 10 passing through certain of the spokes 2. Screws 75 unite one of the plates 9 with the body 1. In its inner edge, the annular body 1 is provided with recesses 4 defining lugs 3. Abutting against the lugs 3 are V-shaped partitions 5 held in place by screws 50 engaging one of the side plates 9. Projecting from the annular body 1 in the recesses 4 are studs 6 equipped at their inner ends with bosses 7.

A hub 8, preferably in the form of a disk, is mounted to move within the contour of the annular body 1, and is small enough so that it may have a limited vertical movement. The hub 8 is guided in its vertical movement, by the side plates 9. In the side plates 9 are fashioned openings 11 of sufficient size to permit the vertical movement of a tubular bearing 12 carried by the hub 8. Threaded or otherwise secured to the bearing 12 are closures 14 for the openings 11. One of the closures 14 may be provided with a lubricating means, such as an oil cup 100, discharging within the contour of the wheel. The closures 14 are provided upon their inner faces with resilient packings 15 seated in grooves in the closures, the function of the packings 15 being to prevent the entrance of dirt and foreign matter into the interior of the wheel.

Projecting outwardly from the hub 8 are fingers 16 equipped with bosses 26 which project circumferentially of the wheel.

In each recess 4 of the body 1, between the partitions 5 is mounted a follower, denoted by the numeral 17. The outer edge of the follower is provided with slots 18, at the bases of which are disposed bosses 19. Strong compression springs 20 lie in the slots 18, the outer ends of the springs 20 being engaged by the bosses 6 which are a part of the body 1, the inner ends of the springs 20 being engaged by the bosses 19 which are located at the inner ends of the slots 18 in the follower 17. The follower 17 is supplied with a circumferentially elongated opening 21 defining arms 22 and fingers 23 which project toward each other. The fingers 23 are rounded on their inner surfaces as shown at 24, so as to coöperate with and rest upon the periphery of the hub 8. The extremities of the fingers 23 are spaced apart to define an opening 25. The fingers 16 on the hub project into the openings 25. Located in the openings 21 of the followers 17 are compression springs 28. The adjacent ends of the springs 28 abut against the fingers 16 on the hub and are received by the bosses 26, the outer ends of the springs abutting against the arms 22 of the followers 17.

In practical operation, the hub 8 is free to move vertically to a limited extent. The springs 20 constitute resilient means for limiting the vertical movement of the hub and, indeed, to limit the movement of the hub in any direction parallel to the plane of the wheel. The circumferential movement of the hub 8 is limited because the fingers 16 of the hub are engaged on both sides by the springs 28.

It will be observed that the construction of the device is such that one of the side plates 9 may be removed readily to give access to the interior of the wheel.

Having thus described the invention, what is claimed is:—

1. In a spring wheel, a body having an opening; a hub having a limited movement within the opening; rigid followers mounted for radial movement in the body; springs interposed between the followers and the body and constituting means for limiting the radial movement of the followers; and a pair of opposed circumferential springs carried by each follower and engaged at their outer ends with said follower, the hub having means for engaging the inner ends of the last specified springs.

2. In a spring wheel, a body having an opening; a hub having limited movement within the opening and provided with projections; followers mounted to move radially in the body and having openings; springs interposed between the followers and the body and constituting means for limiting the radial movement of the followers; and springs in the openings of the followers, the springs engaging opposite faces of the projections of the hub.

In testimony that I claim the foregoing as my own, I have hereto affixed my signature in the presence of two witnesses.

WILLIAM G. PASSMORE.

Witnesses:
 JOHN H. SYMONS,
 LOUIS MORGANWROTH.

Copies of this patent may be obtained for five cents each, by addressing the "Commissioner of Patents, Washington, D. C."